Feb. 14, 1950        H. JAFFE        2,497,672
PIEZOELECTRIC APPARATUS
Filed March 19, 1945        2 Sheets—Sheet 1
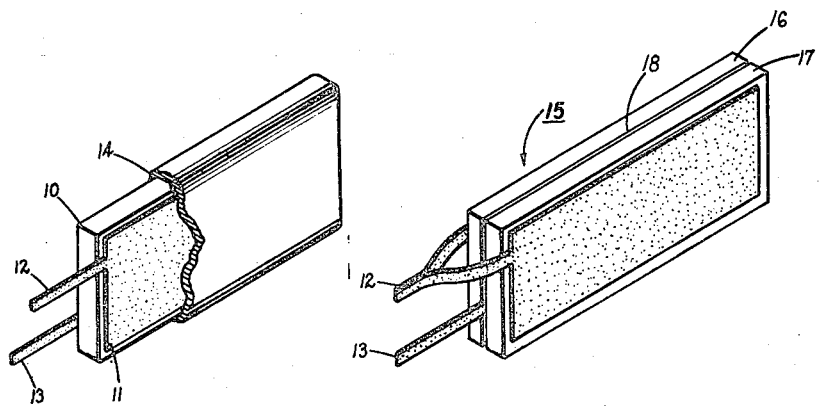
FIG. 1        FIG. 2
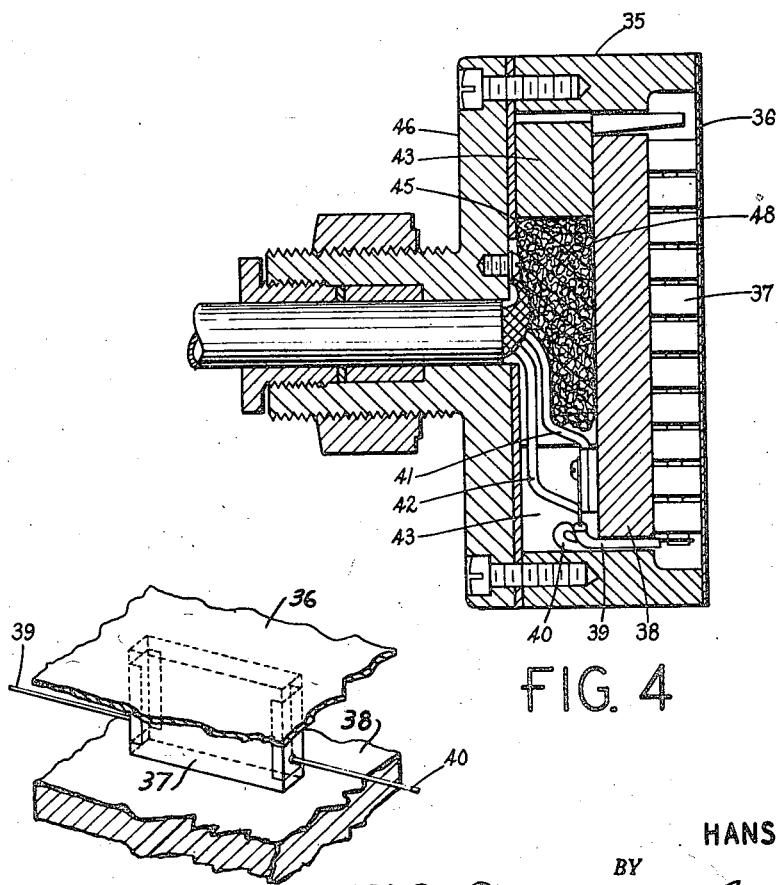
FIG. 4
FIG. 3
INVENTOR.
HANS JAFFE
BY
*Elver J. Hyde*
ATTORNEY Feb. 14, 1950          H. JAFFE          2,497,672

PIEZOELECTRIC APPARATUS

Filed March 19, 1945          2 Sheets-Sheet 2

INVENTOR.
HANS JAFFE
BY
*Elers J. Hyde*
ATTORNEY

Patented Feb. 14, 1950

2,497,672

UNITED STATES PATENT OFFICE 2,497,672

PIEZOELECTRIC APPARATUS

Hans Jaffe, Cleveland Heights, Ohio, assignor to The Brush Development Company, Cleveland, Ohio, a corporation of Ohio Application March 19, 1945, Serial No. 583,424

15 Claims. (Cl. 171—327)

My invention pertains to crystals of an ammonium salt, and more particularly to means for and methods of preventing said crystals from decomposing.

When crystals of an ammonium salt are heated above a certain temperature they tend to decompose into their constituent chemicals and lose some of their valuable properties, such, for example, as their piezoelectric property or their electro-optic property.

Examples of some of these ammonium salt crystals are primary ammonium phosphate, primary ammonium arsenate, primary ammonium-thallium phosphate, ammonium pentaborate, and ammonium lithium sulphate (Hexagonal form).

While the principles disclosed herein hold true for many ammonium salt crystals, I describe my invention in detail in connection with the ammonium salt crystal primary ammonium phosphate. It is to be realized, however, that the specific values of concentrations and temperatures which hold true for primary ammonium phosphate are not necessarily the true values of concentrations and temperatures for the other crystal substances.

When sections of primary ammonium phosphate crystals are heated to temperatures of about 125 degrees centigrade or higher and then cooled, a layer of sticky, semi-liquid material will be noticeable on the surface thereof. Several hours heating at about 125 degrees centigrade is necessary before this semi-liquid material will be noticed, but at higher temperatures shorter heating time will result in this semi-liquid material forming on the faces of the crystal. This semi-liquid material consists primarily of phosphoric acid and is formed by decomposition of the primary ammonium phosphate into phosphoric acid and ammonia gas ($NH_3$). The coating of phosphoric acid attracts moisture to the crystal even in fairly dry atmospheres and forms an electrically highly conducting layer on the surface of the crystal thereby destroying the electrical insulation essential to most piezoelectric and electro-optic applications of the crystal. Because of this characteristic, primary ammonium phosphate plates have heretofore been exposed to temperatures only slightly above about 120 degrees centigrade, and then for only short periods of time. The higher the temperature to which the crystal was exposed the shorter the exposure time had to be in order to prevent decomposition.

An object of my invention is to provide a method of utilizing crystals of an ammonium salt at elevated temperatures.

Another object of my invention is to provide for use at elevated temperatures piezoelectric and electro-optic crystals and crystal devices wherein the crystals are of an ammonium salt.

Still another object of my invention is to provide means for and methods of fabricating ammonium salt crystal devices at elevated temperatures.

It is also an object of my invention to provide piezoelectric and electro-optic crystals of an ammonium salt which may be utilized with thermosetting materials having a curing temperature above the decomposition temperature of the crystal.

It is an object of my invention to increase the power handling capacity of transducers.

Another object of my invention is to provide means for and a method of utilizing ammonium salt piezoelectric and electro-optic crystals at temperatures up to the melting point of the crystalline material.

Other objects and a fuller understanding may be had by referring to the following description and claims and to the drawings wherein:

Figure 1 illustrates isometrically a crystal plate of an ammonium salt with a portion of its coating broken away.

Figure 2 illustrates a multiplate flexing type of crystal element primarily suited for piezoelectric devices.

Figure 3 schematically illustrates a piezoelectric crystal element mounted between a base and a diaphragm.

Figure 4 is a cross-sectional view of a transducer utilizing one form of my invention.

Figure 5:
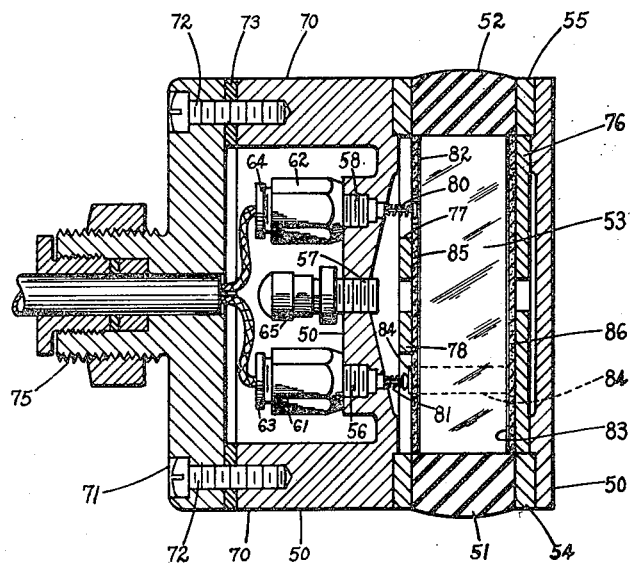

Figure 5 is a sectional view of another form of my invention, and

Figure 6:
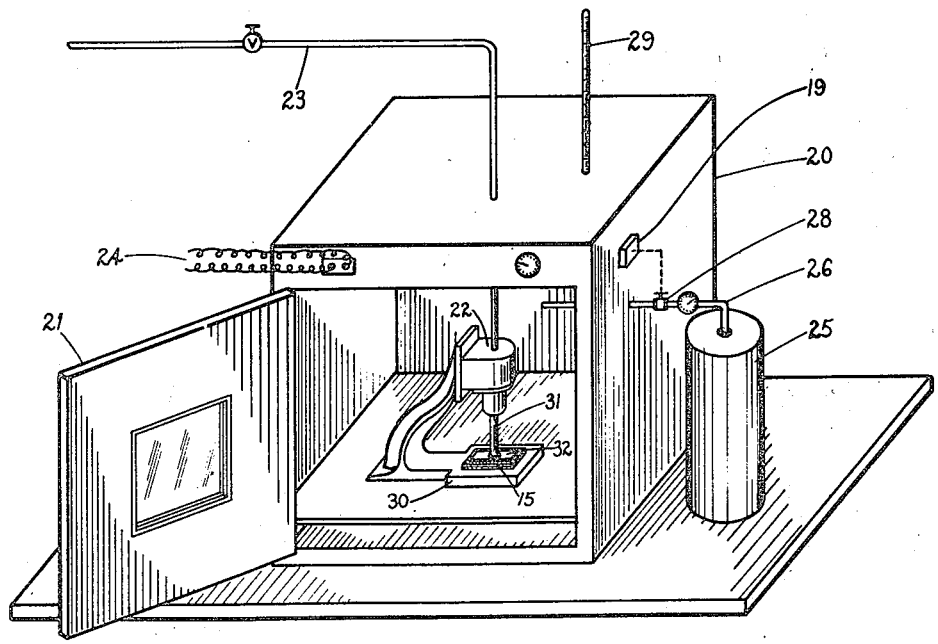

Figure 6 is an isometric view of a device suitable for performing manufacturing operations on a crystal at elevated temperatures.

In my invention I maintain crystals of an ammonium salt in an ammonia gas atmosphere of sufficient concentration to prevent decomposition of the crystal over a wide temperature range during steps in the fabrication of a crystal element and while the crystal element is in operation. The temperature range for primary ammonium phosphate crystalline material is from about 120 degrees centigrade to about 190 degrees centigrade where melting of the crystalline material commences. Within this temperature range crystals can be molded in plastic holders, thermosetting adhesive materials may be heat cured, thermosetting moisture resistant coatings may be heat cured, and crystals can be tempered to obtain more uniform mechanical behavior.

Examples of the materials which may be used for molding crystals or for cementing crystals together or to a base are thermosetting resins such as allyl or the formaldehyde group of urea, phenol or melamine. Examples of coatings are the geon, silicone and saran resins and latex solutions of vinyl chloride or polyethylene. The solvent for the latex solution should be something other than water, such for example as benzol, naptha, or gasoline, and after the solute has been deposited on the crystal it should be baked to close the pores which exist. Flame spraying with polyethylene powder may also be used. In molding a crystal care should be exercised that the molding material has a coefficient of thermal expansion close to the coefficient of thermal expansion of the crystal. Otherwise upon cooling the molded material is apt to pull away from the crystal, or if it has good adhesive qualities, is apt to break the crystal.

When the crystal is heated to temper it or to cure a thermosetting material or to mold it, an atmosphere of ammonia gas is caused to be in contact with the surface of the crystal. The higher the temperature of the crystal the greater the concentration of the ammonia gas should be to prevent decomposition. The equilibrium vapor pressure of primary ammonium phosphate at 125 degrees centrigrade is .05 mm. Hg, and at 150 degrees centigrade is still below 1 mm. Hg. It is believed that at the melting point of about 190 degrees centigrade the equilibrium vapor pressure is in the order of 50 mm. Hg. If at any given temperature a concentration of ammonia gas is maintained in contact with the surface of the crystal which corresponds to a partial gas pressure of the ammonia of more than the equilibrium vapor pressure of the crystal then no decomposition will take place. The concentration of ammonia gas, however, should not be so great as to lead to the formation of secondary ammonium phosphate on the surface of the crystal. The equilibrium vapor pressure of ammonia gas over the secondary phosphate is 30 mm. Hg at 125 degrees centigrade. Thus, at this temperature a partial ammonia gas pressure between about .05 mm. Hg and 39 mm. Hg will maintain primary ammonium phosphate stable indefinitely. Generally, a satisfactory solution to the decomposition of primary ammonium phosphate is to provide at any given temperature throughout the range from about 120° to 190° centigrade a partial ammonia gas pressure which is several times (for example 5 to 10 times) as high as the equilibrium vapor pressure of the primary ammonium phosphate at the same temperature.

One means for approaching this result is illustrated in Figure 1 wherein is illustrated a crystal 10, for example, of primary ammonium phosphate. The crystal has two of its faces electroded by electrode material 11 which may be metallic foil, graphite, silver paint, evaporated gold, or the like, and leads 12 and 13 are in electrical conducting engagement respectively with the two electrodes. The plate of crystalline material 10 is completely covered by a coating of material impervious to the passage of ammonia gas. If the coated crystal is heated to a temperature above about 120 degrees centigrade a minute amount of ammonia gas will be liberated within the coating. Further heating will increase the concentration of ammonia gas in contact with the surface of the crystal and will prevent further decomposition which otherwise would have occurred.

Figure 2 illustrates a multiplate flexing element 15 comprised of two piezoelectric plates 16, 17 so cut from the mother crystal and oriented with respect to each other and to their electrical connections that for a given electric field applied between the leads 12 and 13 one of the plates tends to expand and the other to contract thereby producing a flexing action. The two plates 16, 17 should be firmly connected together by an adhesive 18. This adhesive should be hard to prevent one plate from slipping with respect to the other. The adhesive 18 cannot be of the type which includes a solvent because only a small portion of it around the edges is in contact with air sufficiently to dry thoroughly, and the inner portion will always remain undried. The large center area will therefore never obtain its maximum adhesive properties and slippage of one plate with respect to the other will occur, thereby materially reducing the effectiveness of the multiplate unit. By using primary ammonium phosphate crystals and a thermosetting adhesive such as those aforementioned, and in particular a phenolic condensate product such as "Bakelite" cement, together with my method for preventing the decomposition of the crystalline material due to exposure to the temperature necessary to cure the cement, it is possible to achieve a much superior bond.

Figure 3 illustrates bonding a crystal plate 37 to a base and to a diaphragm, the crystal element being of the type which changes its dimension in the direction between the base and the diaphragm when an alternating electrical signal is applied between the leads 39, 40. The various adhesives which were heretofore mentioned may be utilized to cause the crystal to adhere to the base and to the diaphragm. As with the multiplate flexing element an air drying cement is unsatisfactory. A thermosetting adhesive should be used and baked to cure it to bring out the maximum adhesive qualities.

Figure 6 illustrates a device useful in cementing two crystal plates into a multiplate flexing element and for surrounding it with ammonia gas while it is heated to a temperature sufficient to cure the thermosetting adhesive. The device comprises a box 20 having a door 21, this box being approximately but not completely air-tight. Within the box there is positioned a small hydraulic or pneumatic press 22, and extending through the box 20 and into the housing of the press is a fluid or air line 23 for actuating the press 22. The box may be made of a thermal insulating material and within it there is positioned an electrical heater capable of raising the temperature to about 190 degrees centigrade. The circuit connections 24 for the heater extend through the wall of the box. A tank 25 of ammonia gas is positioned on a table beside the box 20 and the outlet 26 from the tank extends into the interior of the box. A valve 28 is positioned in the outlet pipe for regulating the flow of gas into the box 20 in accordance with the temperature within the box. A thermometer 29 is provided for reading the temperature within the box 20. The press 22 includes a rigid base plate 30 and a plunger 31 having a rigid flat plate 32 on its lower end. When two plates of crystal are to be cemented together they are placed on the base plate 30 with their cement covered faces together and the press is operated until the rigid plate 32 is in contact with the upper face of the crystal element. With the door 21 closed the interior of the box is heated until the cement used to stick the plates together has cured sufficiently. Pressure can be exerted on the crystal element 15 either during the heating process or during the subsequent cooling of the element 15, or, if desired, throughout the entire process. While the crystal is hot sufficient ammonia gas is bled into the box 20 from the tank 25 to maintain a concentration sufficient to prevent decomposition of the crystalline material. In order to control the concentration of ammonia gas in the box 20 in accordance with the temperature within the box, I provide a thermostatic switch 19 for opening the valve 28 as the temperature within the box 20 increases.

A somewhat similar box but without the press 22 may be used to temper crystals to relieve strains and to render them more uniform, and slight changes may be made in the setup in order to adapt it to mass production or continuous operation.

Figure 4 illustrates a transducer embodying my invention. It comprises a square or annular housing 35 to which is soldered a thin diaphragm 36. An array of piezoelectric crystals 37 of the expander type or cemented to a massive base plate 38 to form a unit and the unit is placed in the housing 35 with the faces of the crystals against the inner face of the diaphragm 36. Electrical connections are made from the crystal element leads 39, 40 to the cable wires 41, 42, and a number of blocks 43 are put into the housing to hold the crystal unit in place. A bag 45 containing a substance 48 which more readily gives off ammonia gas than the crystals 37 is then put into the housing 35 and the back plate 46 is bolted into place.

This substance may be a gas-adsorbent material such as charcoal, activated alumina, or silica gel on which ammonia gas previously has been adsorbed. Further, this substance may be an ammonium compound having equilibrium vapor pressure higher than the crystal to be protected through a specified temperature range. For fairly high ammonia vapor pressures salts containing $NH_3$ in coordination bond, also called ammonates, are suitable, such as copper tetrammino sulfate, $Cu(NH_3)_4SO_4 \cdot H_2O$, or magnesium hexammino chloride $Mg(NH_3)_6SO_4$. For ammonia gas pressure which remains below one atmosphere up to around 200° centigrade or higher, certain neutral ammonium salts are suitable such as ammonium oxalate $(NH_4)_2C_2O_4 \cdot H_2$), ammonium phthalate, or ammonium carbonate $(NH_4)_2CO_3$. The substance 48 has the property of giving off ammonia gas at a lower temperature than the crystals 37 do, thereby providing a gas concentration within the air-tight housing of the transducer which is sufficient to prevent the crystals 37 from decomposing. As the temperature of the transducer is raised the substance 48 gives off more and more ammonia gas thereby raising the concentration within the housing and preventing the crystals 37 from decomposition even at relatively high temperatures. If a thermosetting cement has been used between the crystals and the base and between the crystals and the diaphragm then it should be baked to cure the cement, and the ammonia gas liberated by the material 48 will prevent decomposition of the crystalline material 37 during the baking process.

Figure 5 illustrates another form of my invention wherein the transducer housing is filled with ammonia gas prior to finally sealing it shut. A housing 50 of cast iron or the like having a pair of diametrically opposite window openings encloses a piezoelectric crystal element 53 of the expander type. The window openings are closed by means of sound vibration transmitting rubber inserts 51, 52 which are molded in brass rings 54, 55. The brass rings are squeezed into the window openings thus sealing both windows against the ingress of moisture. The ends of crystal element 53 which are perpendicular to an axis of piezoelectric expansion and contraction are positioned firmly against the inner faces of the two sound transmitting rubber windows 51, 52. One side of the housing 50 includes three threaded openings 56, 57, and 58, two of which (56, 58) are adapted to receive threaded nipples 61, 62 which are connected to electrical leads 63, 64, and the third of which is adapted to receive a threaded valve 65 constructed somewhat like a tire valve. The housing 50 includes an outwardly extending annular ring portion 70. A cap 71 is connected to the ring portion 70 of the housing 50 by means of bolts 72, and a gasket 73 is positioned between the cap and the ring portion of the housing to effect a waterproof seal. The leads 63, 64 extend out through the cap 71 and a waterproof connection device indicated generally by the reference character 75 is provided to prevent moisture from seeping in around the cable.

The crystal element 53 has corprene strips 85, 86 on two of its sides and is contained in a "Bakelite" housing 76 having a pair of openings 77, 78 on the side thereof adjacent the threaded nipples 61, 62. Each of the nipples 61, 62 carries a spring biased contact 80, 81 which is in electrical contact with one of the crystal element leads 61, 62. The crystal electrode 82 is engaged by the spring biased contact 80, and the crystal electrode 83 has a lead extension 84 which is wrapped around the crystal and is engaged by the spring biased contact 81. The corprene strips 85, 86 serve as insulators to prevent the lead 84 from shorting out against the electrode 82, and also serve to prevent undue and unwanted vibrations from being transmitted to the "Bakelite" housing 76 and to the cast-iron housing 50.

The steps of assembling the device are as follows: one of the windows, for example, the window comprising the rubber insert 51 and the ring 54 is forced into one of the openings in the housing 50. The crystal element assembly comprising the crystal 53 with its corprene strips and its "Bakelite" housing 76 is inserted in the housing through the other window opening and then the window 52 is forced into place. Care must be exercised that the exposed parts of the crystal electrodes 82, 83 are toward the spring biased contacts 80, 81. One of the nipples, for example 61, is screwed into place with its contact engaging the electrode extension 84. A pipe connected to a source of vacuum is screwed into the other threaded opening 58 and a pipe leading to a tank of compressed ammonia gas is connected to the valve stem 65. The gas line has a valve in it which is closed to prevent gas from entering the enclosed portion of the housing 50 while the vacuum line which is connected in the opening 58 partially exhausts the air. The vacuum line is then closed and ammonia gas is caused to enter the housing by opening the valve in the gas line. Sufficient gas is bled through the housing to assure a concentration therein which will permit operation of the transducer at elevated temperatures. The vacuum line is disconnected and the nipple 62 is screwed in place. When the nipple 62 is tightly in place the flow of ammonia gas may be terminated and the gas pipe removed from the valve stem 65. The cap 72 is then bolted in place with the cable comprised of the leads 41, 42 extending through the seal 75.

While the above described transducer will operate as a generator device, i. e., it will establish a voltage in accordance with mechanical forces applied to the crystal, its primary advantage is realized when it is used as a motor device, i. e., it will establish mechanical forces in accordance with voltages applied to the crystal. The reason for this is that whereas very little power is usually handled in the generator devices the motor devices usually are required to handle considerable power. In a well-engineered piece of piezoelectric equipment which has at its function the conversion of energy from one system to another the ultimate limitation in the operation of the device is the temperature rise which may be permitted by the components used in the design. This limitation is serious in sound generators utilizing Rochelle salt crystals as permanent injury to the Rochelle salt crystalline material at relatively low temperatures is caused by the water of crystallization being driven off. Primary ammonium phosphate does not have water of crystallization to be driven off but upon the application of sufficient heat will decompose liberating ammonia gas in the process. By reducing the liberation of ammonia gas the temperature at which a transducer (motor or generator) may be operated is increased, and if the liberation is completely prevented the transducer may be operated at temperatures up to the melting point of the crystalline material. Thus for loudspeakers and particularly for underwater loudspeakers where the power handled materially heats the piezoelectric crystalline material my invention is particularly useful.

It is to be understood that the described invention also includes protecting an ammonium salt crstal at its melting point. This is of importance in the processes of growing such a crystal from the melt, and of laminating crystal plates into multiplate elements. This latter process is described in detail in the Gravely application Serial No. 576,561, and briefly comprises positioning a layer of electrically conductive material between two crystal plates and inductively heating the layer until the crystalline material immediately adjacent it is melted.

In devices which use the electro-optic effect in crystals, such as is shown and described in my United States Patent No. 2,463,109, issued March 1, 1949, strong light traverses the crystal and one of the limitations in the system is the temperature which the crystalline material will withstand. By enclosing the crystalline material in a light-transparent housing of a material such as glass and filling the housing with ammonia gas the crystal will withstand much greater light intensities.

While I have described my invention with a certain degree of particularity, it is to be understood that the illustrated means are by way of example, and that changes may be made in the construction and arrangement of parts without departing from the spirit and scope of my invention.

I claim as my invention:

1. A piezoelectric device comprising a piezoelectric crystal which tends to decompose with liberation of ammonia gas, a housing around said crystal, and ammonia gas within said housing and in contact with the surface of said crystal.

2. A piezoelectric device comprising a piezoelectric crystal which tends to decompose with liberation of ammonia gas, a housing around said crystal, and means other than said crystal for supplying ammonia gas to the interior of said housing, the ammonia gas within said housing being in contact with the surface of said crystal.

3. A piezoelectric device comprising, a substantially sealed housing, a piezoelectric crystal which tends to decompose with liberation of ammonia gas mounted within said housing, and ammonia gas within said housing and in contact with said crystal.

4. The method of preventing a plate of piezoelectric crystalline material of an ammonium salt from decomposing at a temperature between about 120 degrees centigrade and the melting point of said salt comprising the steps of: surrounding said crystalline material with ammonia gas, and causing the concentration of said ammonia gas to increase as the temperature of said crystalline material increases.

5. The method of preventing a plate of piezoelectric crystalline material of an ammonium salt from decomposing at a given temperature comprising the steps of: maintaining ammonia gas in contact with the surface of said crystalline material, the concentration of said ammonia gas corresponding to a partial gas pressure of ammonia of more than the equilibrium ammonia vapor pressure of the crystalline material.

6. The method as set forth in claim 5, with the further characterization that the crystalline material is primary ammonium phosphate and the given temperature lies within the range of about 120 to about 190 degrees centigrade.

7. The method of preventing a plate of piezoelectric primary ammonium phosphate crystalline material from decomposing over a temperature range of from about 120 to 190 degrees centigrade comprising the steps of: maintaining ammonia gas in contact with the surface of said crystalline material, the concentration of said ammonia gas at 120 degrees centigrade corresponding to a partial gas pressure of ammonia of more than the equilibrium ammonia vapor pressure of the crystalline material, and increasing the concentration of said ammonia gas as the temperature of said crystalline material increases within said range to mtaintain said relationship.

8. A transducer comprising a plate of piezoelectric primary ammonium phosphate crystalline material which tends to decompose within the temperature range of from about 120 to 190 degrees centigrade with liberation of ammonia gas, a housing enclosing said plate, and means for supplying ammonia gas to the interior of said housing to contact the surface of the crystalline material, the concentration of ammonia gas supplied by said means at a given temperature within said range corresponding to a partial gas pressure of ammonia of more than the equilibrium ammonia vapor pressure of the crystalline material at said temperature, said source of ammonia gas being temperature sensitive to automatically increase the concentration of ammonia gas in contact with said crystalline material as the temperature of said crystalline material increases within said range.

9. A transducer as set forth in claim 8, further characterized in that said means for supplying ammonia gas is an adsorbent material which contains adsorbed ammonia gas.

10. A transducer as set forth in claim 8, further characterized in that said crystalline material is enclosed in a substantially sealed housing and said means for supplying ammonia gas is a quantity of an ammonate having an ammonia vapor pressure higher than the ammonia vapor pressure of the said primary ammonium phosphate through the range from about 120 degrees to 190 degrees centigrade.

11. A transducer as set forth in claim 8, further characterized in that said crystalline material is enclosed in a substantially sealed housing and said means for supplying ammonia gas is a quantity of an ammonium salt having an ammonia vapor pressure higher than the ammonia vapor pressure of the said primary ammonium phosphate through the range from about 120 degrees to 190 degrees centigrade.

12. A transducer comprising a plate of piezoelectric primary ammonium phosphate crystalline material which tends to decompose within the temperature range of from about 120 to 190 degrees centigrade with liberation of ammonia gas, a housing enclosing said plate, means for supplying ammonia gas to the interior of said housing to contact the surface of the crystalline material, the concentration of ammonia gas supplied by said means at a given temperature within said range corresponding to a partial gas pressure of ammonia of more than the equilibrium ammonia vapor pressure of the crystalline material at said temperature, and means to increase the concentration of ammonia gas in contact with said crystalline material as the temperature of said crystalline material increases within said range.

13. A transducer as set forth in claim 12, further characterized in that said means for supplying ammonia gas is connected to a reservoir of compressed ammonia gas, valve means, and thermostatic means to control said valve means to increase the concentration of said gas upon the temperature of said crystalline material increasing.

14. A tranducer as set forth in claim 12, further characterized in that said means for supplying ammonia gas is an adsorbent material which contains adsorbed ammonia gas.

15. The method of preventing piezoelectric crystalline material of an ammonium salt from decomposing at a given temperature comprising the steps of: surrounding said crystalline material with an ammonia gas atmosphere, the concentration of said ammonia gas corresponding to a partial gas pressure of ammonia of more than the equilibrium ammonia vapor pressure of the crystalline material.

HANS JAFFE.

REFERENCES CITED

The following references are of record in the file of this patent:

UNITED STATES PATENTS

| Number | Name | Date |
| --- | --- | --- |
| 1,366,720 | De Loisy | Jan. 25, 1921 |
| 1,785,375 | Bachanan | Dec. 16, 1930 |
| 1,874,980 | Hansell | Aug. 30, 1932 |
| 2,051,029 | Curtis | Aug. 18, 1936 |
| 2,085,584 | Hashell | June 29, 1937 |
| 2,147,712 | Mason | Feb. 21, 1939 |

FOREIGN PATENTS

| Number | Country | Date |
| --- | --- | --- |
| 376,174 | Great Britain | July 7, 1932 |

Certificate of Correction

Patent No. 2,497,672                                    February 14, 1950

HANS JAFFE

It is hereby certified that errors appear in the printed specification of the above numbered patent requiring correction as follows:

Column 8, lines 1 and 6, after the word "comprising" insert a comma; line 55, for "mtaintain" read *maintain*; column 10, line 13, after "preventing" insert *a plate of*; and that the said Letters Patent should be read with these corrections therein that the same may conform to the record of the case in the Patent Office.

Signed and sealed this 30th day of May, A. D. 1950.

[SEAL]

THOMAS F. MURPHY,
*Assistant Commissioner of Patents.*